United States Patent
Mayer

(10) Patent No.: US 10,001,254 B2
(45) Date of Patent: Jun. 19, 2018

(54) ILLUMINATING DEVICE WITH ADJUSTMENT OF THE OPTICAL COMPONENTS

(71) Applicant: ZKW GROUP GMBH, Wieselburg (AT)

(72) Inventor: Matthias Mayer, Mank (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days. days.

(21) Appl. No.: 15/573,590

(22) PCT Filed: May 6, 2016

(86) PCT No.: PCT/AT2016/050131
§ 371 (c)(1),
(2) Date: Nov. 13, 2017

(87) PCT Pub. No.: WO2016/179620
PCT Pub. Date: Nov. 17, 2016

(65) Prior Publication Data
US 2018/0119914 A1    May 3, 2018

(30) Foreign Application Priority Data
May 13, 2015    (AT) .............................. A 50401/2015

(51) Int. Cl.
*F21S 41/63*    (2018.01)
*G02B 7/02*    (2006.01)

(52) U.S. Cl.
CPC ............. *F21S 41/635* (2018.01); *F21S 41/16* (2018.01); *F21S 41/176* (2018.01); *G02B 7/023* (2013.01)

(58) Field of Classification Search
CPC ........ F21S 41/635; F21S 41/176; F21S 41/16; G02B 7/023
See application file for complete search history.

(56) References Cited

U.S. PATENT DOCUMENTS

| 4,870,548 A | 9/1989 | Beachy et al. |
| 5,068,768 A | 11/1991 | Kobayashi |

(Continued)

FOREIGN PATENT DOCUMENTS

| CN | 201661934 U | 12/2010 |
| DE | 3515493 A1 | 10/1986 |

(Continued)

OTHER PUBLICATIONS

Office Action issued in Austrian Application No. A 50401/2015, dated Apr. 13, 2016 (4 pages).

(Continued)

*Primary Examiner* — Sonji Johnson
(74) *Attorney, Agent, or Firm* — Eversheds Sutherland (US) LLP

(57) ABSTRACT

In an illuminating device (A), in particular for a motor vehicle, light emitted by an area light source (K) is projected as distributed light by an optical arrangement (E). The optical arrangement (E) comprises at least a first and a second optical component (L1, L2) axially one after the other, as seen along a longitudinal axis (x). In order to adjust the position thereof in the axial direction, an adjusting device (C) is provided for the optical components (L1, L2), said device having a first adjusting ring (G1), which can be rotated about the longitudinal axis (x) and is connected to an extension piece (J1) via a transmission connection, which converts rotation of the first adjusting ring (G1) in relation to the extension piece (J1) into axial displacement. A holder (H1) of the first optical component (L1), with the aid of a spring arrangement (I1), is retained axially in relation to the first adjusting ring (G1) and can be adjusted axially in relation to the extension piece (J1), whereas the second optical component (L2) is retained in a holder (H2) which is (Continued)

Figure 1:
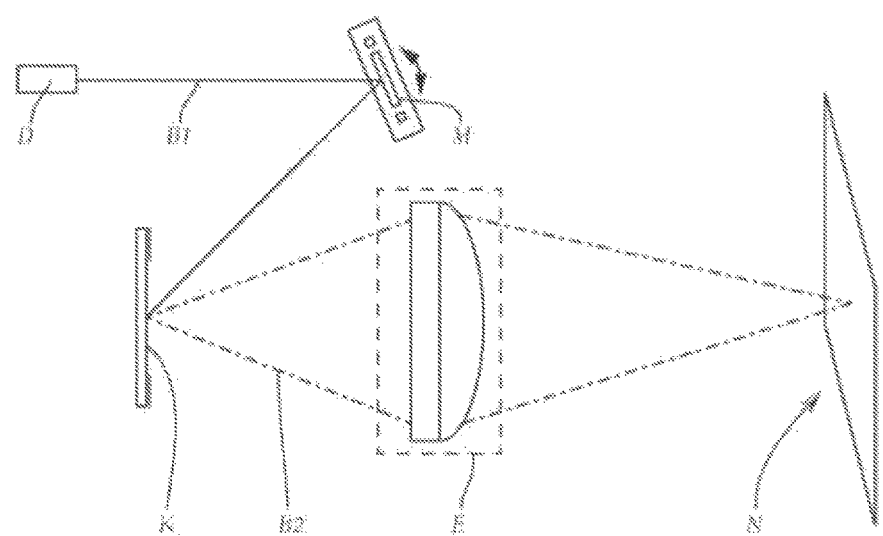

secured axially to the extension piece (J1), for example is integral therewith.

15 Claims, 3 Drawing Sheets

(56) References Cited

U.S. PATENT DOCUMENTS

| | | |
|---|---|---|
| 2006/0221469 A1 | 10/2006 | Ye |
| 2008/0316733 A1 | 12/2008 | Spartano et al. |
| 2010/0208371 A1 | 8/2010 | Chao |
| 2011/0299287 A1 | 12/2011 | Liao |

FOREIGN PATENT DOCUMENTS

| | | |
|---|---|---|
| DE | 102006041428 A1 | 3/2008 |
| DE | 102007053399 A1 | 5/2009 |
| DE | 202011108359 U1 | 1/2012 |
| JP | H07-192504 A | 7/1995 |
| WO | 2000/049334 A1 | 8/2000 |
| WO | 2006/072885 A1 | 7/2006 |

OTHER PUBLICATIONS

International Search Report and Written Opinion for PCT/AT2016/050131, dated Aug. 16, 2016 (11 pages).
International Preliminary Report on Patentability for PCT/AT2016/050131, dated Nov. 23, 2017 (16 pages).

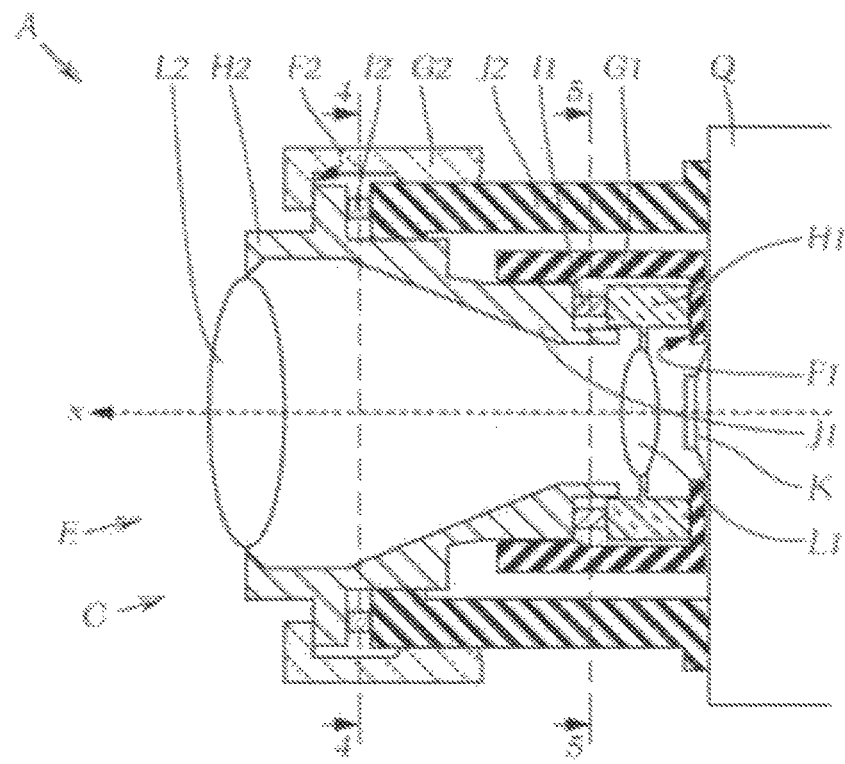

ILLUMINATING DEVICE WITH ADJUSTMENT OF THE OPTICAL COMPONENTS

The invention relates to an illuminating device, in particular for a motor vehicle, having at least one area light source and an optical arrangement, which is configured to project light emitted from the at least one area light source in the form of at least one light distribution, wherein the optical arrangement comprises, in an axial order with regard to a longitudinal axis, a first and a second optical component, the position of which is axially adjustable—for example, two lenses adjustable in axial direction.

Within the scope of the disclosure, optical component is an optical component with light-collecting or light-scattering properties and more specifically, a form reflector (e.g. concave or collecting mirror) or an optical lens, wherein combinations of these components can also be included. A longitudinal axis is an axis along which the optical components are arranged, wherein in most cases, the main direction of the light propagation and the optical axis coincide with this longitudinal axis.

The use of laser light sources in motor vehicles, particularly for headlights of motor vehicles, is currently gaining in importance because laser diodes allow for more flexible and efficient solutions; as a result, the light density of the light beam as well as the light output can be significantly increased.

However, with the known solutions, the laser beam is not directly emitted from the illuminating device or headlight, in order to prevent danger to the eyes of humans and other living creatures due to the extremely collimated high-powered light beam. Instead, the light beam is directed toward an interposed conversion element which contains a material for luminescence conversion, "phosphor" for short, and converts the laser light, for example a wavelength in the blue range, to visible light, preferably white light; this visible light is subsequently directed outwardly. Within the scope of the present invention, "phosphor" generally refers to a substance or substance mixture that converts light of one wavelength into light of a different wavelength or a wavelength mixture, particularly into "white" light; which may also be subsumed under the term "wavelength conversion." Optoceramics, which are transparent ceramics, such as YAG-Ce (a cerium-doped yttrium aluminum garnet), can also be used for the conversion element. In this manner, a luminous image is generated by the laser beam on the flat conversion element, and this luminous image is projected as light distribution onto the surface of a road by means of an optical arrangement, for example, imaging optics with reflectors and/or preferably lenses.

Thus, in such a system, the light source is not a point light source but a planar light image, the shape of which is freely selectable. Accordingly, the optical arrangement is designed to image light emitted from the planar light source in the form of at least one light distribution. For that purpose, the sharpest possible imaging onto the road/surface of the luminous image, which is generated on the conversion element, is desired in order to be able to achieve an optimal effect of the thus projected luminous image. However, due to deviations and tolerances of the optical components, the associated frames (holders), and not least also the position of the phosphor, frequently a situation arises where the light distribution is projected with insufficient sharpness.

Therefore, one objective addressed by the invention is that of providing an accurate and at the same time uncomplicated adjustment of the components of the imaging optics. In particular, an accurate adjustment of the lenses in an imaging system with two lenses (or more generally, with two optical components) is supposed to be provided not only with regard to the phosphor but also with regard to one another.

This problem is solved with an illuminating device of the initially described type by means of an adjusting device of the optical components, said device having a first adjusting ring, which can be rotated about the longitudinal axis and is connected to an extension piece via a transmission connection, which converts a rotation of the first adjusting ring in relation to the extension piece into axial displacement; for that purpose, a holder of the first optical component, with the aid of a spring arrangement, is retained axially to the first adjusting ring and can be adjusted axially in relation to the extension piece, and the second optical component is retained in a holder which is secured axially to the extension piece. Preferably, all or at least one of the optical components can be designed as optical lenses.

With this solution, the transmission connection between the first adjusting ring and the extension piece converts a rotational movement of the first adjusting ring into a change of position of the first optical component (the first lens) relative to the second optical component (the second lens) along the longitudinal axis. This results in the aforementioned objective of the invention in a simple yet effective manner. This adjustment of the imaging optics with regard to the phosphor is lighting-technologically very important yet sensitive to deviations and can thus be simply and quickly adjusted or corrected. The invention makes a quick, simple, and precise focusing of the light image possible and allows for the installation of the optical components in a converter module which can be subsequently adjusted. The invention can be used in all applications of laser light modules (low beam, high beam, etc.) and is also suitable for modules, in which a plurality of laser sources is used.

A simple and practical design of an adjustment at the first adjusting ring may, e.g., provide that the first adjusting ring comprises a thread—preferably an internal thread—which interacts with a mating thread of the extension piece, and that the first adjusting ring also has a stop surface, preferably designed as an annular end face, against which the holder of the first optical component is axially mounted.

In order to also achieve a joint adjustment of the position of both optical components, it is advantageous if the adjusting device also comprises a second adjusting ring, which is rotatable around the longitudinal axis and is connected to a supporting component by means of the transmission connection which converts a rotation of the second adjusting ring in relation to the supporting component into a displacement in axial direction. For this purpose, the holder of the second optical component can additionally be held by means of a spring arrangement against the second adjusting ring and be axially adjustable in relation to the supporting component. This allows for an additional adjustment option, typically the relative position with regard to the phosphor. This contributes to the aforementioned advantages, particularly with regard to the quick, simple, and precise focusing of the light image as well as the installation of the components in a subsequently adjustable converter module.

For the adjustment at the second adjusting ring as well, a simple and practical design may envisage that, for example, the second adjusting ring has a thread—preferably an internal thread—which interacts with (engages) a mating thread of the supporting component, and the second adjusting ring also has a stop surface, preferably designed as an annular end face, against which the holder of the second optical component is axially mounted.

In an advantageous development of the invention, the supporting component may be designed surrounding the first adjusting ring in a sleeve-like manner and comprising at least one window, through which the adjusting ring can be accessed from the outside. This results in a simple structure, wherein the first adjusting ring is additionally supported by the sleeve-like supporting component.

In a favorable embodiment of the invention with regard to the connection between the holder of the second optical component and the extension piece, these two components (i.e. holder and extension piece) may be integral with one another. Alternatively, it is also possible that the holder of the second optical component is connected to the extension piece by means of a rotating coupling which prevents at least a relative movement between said holder and the extension piece along the longitudinal axis.

Furthermore, for the better protection of the optical components from external influences, it may be advantageous if the holder of the second optical component and/or the extension piece surrounds, in a sleeve-like manner, a space of the light distribution between the two optical components.

The invention is particularly suitable for illuminating devices with laser light sources, e.g. in laser headlights. Such a laser-based illuminating device may additionally comprise:
  at least one laser light source for generating laser excitation light, and
  at least one beam redirecting device which is designed to direct laser excitation light generated by the at least one laser light source to the at least one area light source;
  wherein the at least one area light source is designed as a conversion element which, when irradiated with laser excitation light, emits light, preferably in the visible wavelength range, in the direction, said light being imaged by said optical arrangement of the illuminating device.

The described solution according to the invention is particularly suitable for a motor vehicle headlight with one or more illuminating devices of the type described herein. Particularly in case of high-definition light distributions, an adjustment of the focusing properties is required for the light projected onto the road surface; however, due to the inevitable installation deviations and tolerances, a high-precision defining of the focusing is only subsequently possible and thus requires a subsequent adjustment option.

Figure 2:
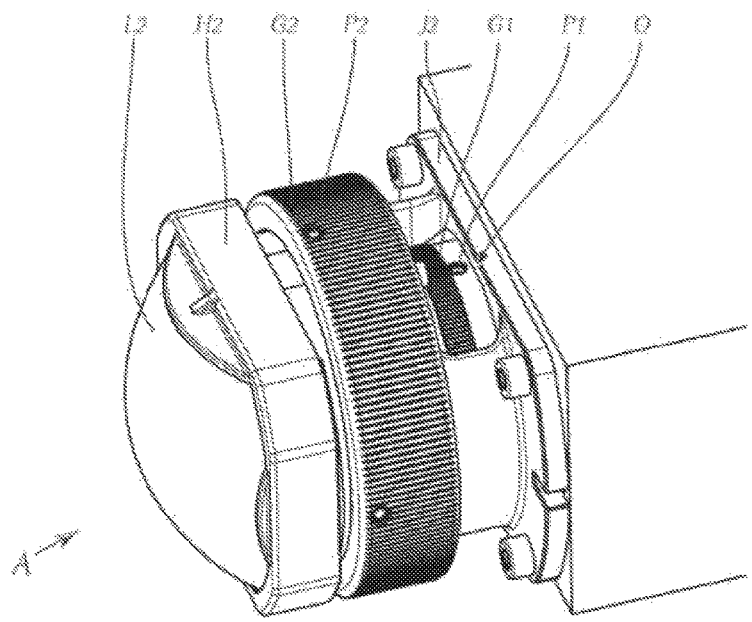
Figure 5:
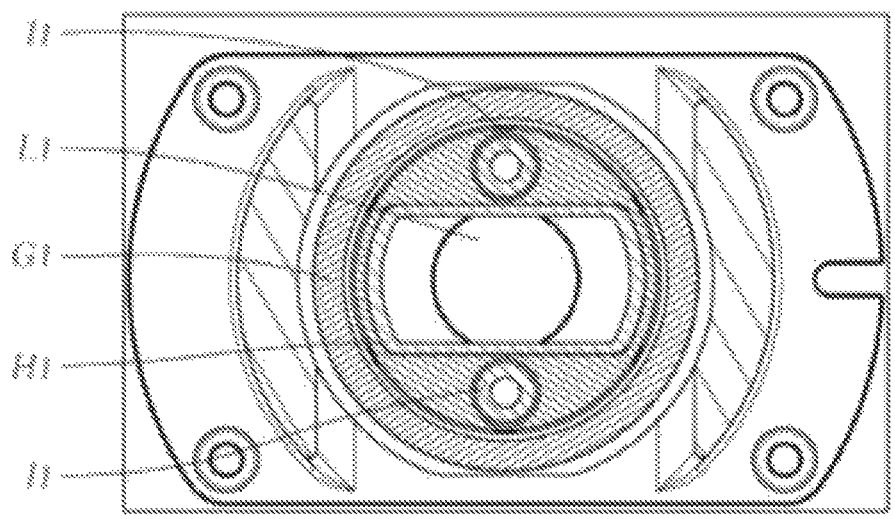

In the following, the invention, including further details and advantages shall be described in more detail using an exemplary and not delimiting embodiment of the invention which is shown in the attached drawings. They show schematically:

FIG. 1 an overview of the beam path in a laser headlight;
FIG. 2 a perspective view of the focusing arrangement of the embodiment;
FIG. 3 the focusing arrangement of FIG. 2 as a longitudinal section;
FIG. 4 a cross-section of the focusing arrangement along the sectional plane 4-4 in FIG. 3; and
FIG. 5 a cross-section of the focusing arrangement along the sectional plane 5-5 in FIG. 3.

The embodiment described in the following relates to a laser headlight for a motor vehicle. In this case, the optical components are realized as lenses, but in other embodiments of the invention, individual or all optical components may also be realized as reflectors, such as concave or curved mirror(s). FIG. 1 shows an overview of the beam path in an illuminating device associated with a headlight. A laser light source D emits a laser beam B1, for example in the blue or ultraviolet spectral range. By means of a pivotable mirror M, the laser beam B1 is directed as excitation light to a phosphor K. The mirror M serves as a beam redirecting device and is preferably pivotable about two axes. Due to the impinging laser light and by luminescence conversion in a known manner, the phosphor K emits, visible light B2, preferably white light. Due to the rapid movement of the mirror M, the point of light generated by the laser beam B1 "wanders" across the flat conversion element, thus generating a luminous image; this luminous image is projected onto the road surface by means of an optical arrangement E, shown only symbolically in FIG. 1, which, for example, can be imaging optics with two or more lenses. By means of the mirror M, a desired light image is thus drawn on the phosphor K which is projected by means of the optical arrangement onto the road surface, where it generates a light distribution N. "Drawn" refers particularly to a scanning process, during which the laser beam B1 is deflected via the mirror M e.g. line by line or in a sine-shaped manner—as a Lissajous—figure, at a speed such that the human eye has the impression of a uniformly luminous area which can be projected as a light image by means of imaging optics onto the road. In FIG. 1, the beam path is shown as reflected at the phosphor, utilizing the converted light B2 propagating on the same side of the phosphor as the laser light B1; however, the beam path can also be transmissive, i.e. the utilized light B2 and the associated optics E lie, with regard to the phosphor, on the side opposite of the impinging laser beam B1.

FIGS. 2 and 3 show an illuminating device A with a beam path which is transmissive at the phosphor, and the optical arrangement thereof is provided with an adjusting device C according to the invention. Due to said adjusting device C, the lenses L1, L2 of the optical arrangement can be adjusted relative to one another with regard to the conversion element (phosphor) K, thus allowing to achieve an extremely sharp image of the luminous image on the conversion element into a light distribution N on the road, as ultimately desired.

The first lens L1 is held in a holder (lens holder) H1. The holder H1 bears against a stop surface F1 of an adjusting ring G1, e.g. an inner end face, and is pressed on from the other side by a spring arrangement I1 which is supported by an extension piece J1 which carries the entire assembly (adjusting ring G1, holder H1, and spring arrangement I1) of the first lens. The spring arrangement I1, for example, may be realized with two rubber springs which lie opposite of one another with regard to the longitudinal axis x. Due to the tensioning force of the spring arrangement I1, the holder is held against the end face F1, thus being positioned in a defined position without play (clearance) relative to the extension piece J1.

By means of a threaded connection, the adjusting ring G1 is connected to the extension piece J1; in this case, e.g. by means of an internal thread of the adjusting ring G1 and a mating thread of the extension piece J1. The extension piece J1 thus carries the lens L1 and the associated adjusting device of the lens. By means of the transmission connection, a rotation of the adjusting ring G1 about the longitudinal axis x in relation to the extension piece J1 can be converted into an axial displacement of the adjusting ring and thus of the lens holder and the lens L1 both mounted therein. The design of the holder H1 (FIG. 5), namely with, e.g. straight surfaces, when seen in longitudinal direction, which counteract a rotation of the holder, results in a rotation prevention; thus, the lens L1 does not rotate as well but moves exclusively in longitudinal direction x.

In the depicted embodiment, the extension piece J1 is rigidly connected to the holder H2 of the second lens L2, is preferably integral with said holder; in a variation, a connection suffices which defines a position of the extension piece, which is predetermined in the axial direction, to the holder H2 but still allows for a rotation about the longitudinal axis.

An adjusting movement of the adjusting ring G1 by rotating same adjusting ring G1 thus effects a change of the distance of the two lenses L1, L2 to one another, resulting in a precise adjustment of the relative position of the two lenses.

For the adjustment of the second lens L2 in its holder (lens holder) H2 as well as the assembly of the first lens L1, a second adjusting ring G2 is provided. For example, the holder H2 has a radially protruding ring strip which interacts with a stop surface F2—e.g. an inner end face—of the adjusting ring G2; it is pressed against said stop surface F2 and the end face by means of a spring arrangement 12. The spring arrangement is supported by an end face of a supporting component J2. The supporting component J2 is designed as a sleeve-like adapter which carries the entire assembly (adjusting ring G2, holder H2, and spring arrangement I2) of the second lens L1, including the assembly of the first lens L1 retained thereon. The spring arrangement I2, for example, can also be realized by two rubber springs which lie opposite of one another with regard to the longitudinal axis x.

Due to the tensioning force of the spring arrangement I2, the holder H2 is held against the end face F2, thus being positioned in a defined position without play (clearance) relative to the adapter J2, which is attached to the housing Q of the illuminating device A and at that place surrounds the space where the phosphor K is located.

By means of a threaded connection, the adjusting ring G2 is connected to the adapter J2, e.g. by means of an internal thread of the adjusting ring G2 and a mating thread of the adapter J2. By means of the transmission connection, a rotation of the adjusting ring G2 about the longitudinal axis x in relation to the adapter J2 can be converted into an axial displacement of the adjusting ring and thus of the holder H2 and the lens L2 both mounted therein. Once again, the holder H2—cf. FIG. 4—is formed for a rotation prevention, namely as seen in longitudinal direction with e.g. straight surfaces; thus the second lens L2 and the assembly of the first lens L1 does not rotate as well but moves exclusively in longitudinal direction x.

An adjusting movement of the adjusting ring G2 by rotating same adjusting ring G2 thus effects a change of the distance of the optical arrangement E to the phosphor K. In combination with the adjusting movement of the adjusting ring G1, a precise adjustment of the positions of the two lenses to the phosphor K is thus possible. For that purpose, at least one window O (FIG. 2), through which the adjusting ring G1 can be accessed, is provided in the adapter J2.

The depicted embodiment is designed for a manual adjustment of the two adjusting rings G1, G2. Once the optical arrangement E is adjusted to a focusing, the adjusting rings G1, G2 can be secured in the adjusting position, for example, by means of locating screws (not depicted) which are inserted in radial threaded holes P1, P2 provided for such purpose. Instead of a manual actuation, it can also be provided that one or both adjusting rings are adjusted by means of a controlled adjustment device.

The invention allows for a quick, simple, and precise adjustment (focusing) of the light distribution in a fully installed laser module. As a result, both the means for adjusting the illuminating device and the associated test device can be designed in a simpler manner. A further advantage results from the fact that the invention provides the optical components with a wide adjustment range, for example, in the magnitude of several millimeters, e.g. ±1.5 mm. Due to the pretension of the holders by means of spring arrangements or similar flexible components, a stable and defined position up to the permanent immobilization is provided.

The invention claimed is:

1. An illuminating device (A) for a motor vehicle, the device comprising:
   at least one area light source (K);
   an optical arrangement (E) configured to project light (B2) emitted from the at least one area light source (K) in the form of at least one light distribution (N), wherein the optical arrangement (E), in axial succession with regard to a longitudinal axis, comprises a first optical component (L1) and a second optical component (L2), the positions of which are axially adjustable; and
   an adjusting device (C) configured to adjust the first and second optical components (L1, L2), the adjusting device comprising a first adjusting ring (G1), which is configured to be rotated about the longitudinal axis (x) and is connected to an extension piece (J1) via a transmission connection which converts the rotation of the first adjusting ring (G1) in relation to the extension piece (J1) into axial displacement,
   wherein a holder (H1) of the first optical component (L1), with the aid of a spring arrangement (I1), is retained axially to the first adjusting ring (G1) and is configured to be adjusted axially in relation to the extension piece (J1), and
   wherein the second optical component (L2) is retained in a holder (H2) which is secured axially to the extension piece (J1).

2. The illuminating device (A) according to claim 1, wherein the adjusting device further includes a second adjusting ring (G2), which is configured to be rotated about the longitudinal axis (x) and is connected to a supporting component (J2) via the transmission connection, which converts rotation of the second adjusting ring (G2) in relation to the supporting component (J2) into a displacement in axial direction, and the holder (H2) of the second optical component (L2), with the aid of a spring arrangement (I2), is retained to the second adjusting ring (G2) and is configured to be adjusted axially in relation to the supporting component (J2).

3. The illuminating device (A) according to claim 2, wherein the second adjusting ring (G2) has a thread, which engages a mating thread of the supporting component (J2), and the second adjusting ring (G2) has a stop surface (F2) against which the holder (H2) of the second optical component (L2) is axially mounted.

4. The illuminating device (A) according to claim 3, wherein the thread of the second adjusting ring (G2) is an internal thread and the stop surface of the second adjusting ring (G2) is designed as an annular end face.

5. The illuminating device (A) according to claim 2, wherein the supporting component (J2) surrounds the first adjusting ring (G1) in a sleeve-like manner and comprises at least one window (O), through which the adjusting ring (G1) is configured to be accessed from outside the device.

6. The illuminating device (A) according to claim 1, wherein the first adjusting ring (G1) comprises a thread, which engages a mating thread of the extension piece (J1), and the first adjusting ring (G1) has a stop surface (F1) against which the holder (H1) of the first optical component (L1) is axially mounted.

7. The illuminating device (A) according to claim 6, wherein the thread of the first adjusting ring (G1) is an internal thread, and the stop surface of the first adjusting ring (G1) is designed as an annular end face.

8. The illuminating device (A) according to claim 1, wherein the holder (H2) of the second optical component (L2) is integral with the extension piece (J1).

9. The illuminating device (A) according to claim 1, wherein the holder (H2) of the second optical component (L2) is connected to the extension piece (J1) by means of a rotating coupling which prevents at least a relative movement between said holder (H2) and the extension piece (J1) along the longitudinal axis (x).

10. The illuminating device (A) according to claim 1, wherein the holder (H2) of the second optical component (L2) and/or the extension piece (J1) surrounds, in a sleeve-like manner, a space of the light distribution between the two optical components (L1, L2).

11. The illuminating device (A) according to claim 1, wherein at least one of the optical components (L1, L2) are designed as optical lenses.

12. The illuminating device (A) according to claim 11, wherein all of the optical components (L1, L2) are designed as optical lenses.

13. The illuminating device (A) according to claim 1, further comprising:
   at least one laser light source (D) for generating laser excitation light (B1), and
   at least one beam redirecting device (M) which is designed to direct laser excitation light (B1) generated by the at least one laser light source (D) to the at least one area light source (K);
   wherein the at least one area light source (K) is designed as a conversion element which, when irradiated with laser excitation light (B1), emits light in the direction to the optical arrangement (E).

14. The illuminating device (A) according to claim 13, wherein the conversion element, when irradiated with laser excitation light (B1), emits light in the visible wavelength range.

15. A motor vehicle headlight having one or more illuminating devices (A) according to claim 1.

* * * * *